United States Patent
Keller et al.

(10) Patent No.: US 10,049,688 B2
(45) Date of Patent: Aug. 14, 2018

(54) METHOD FOR HANDLING ON-HOLD MUSIC DURING TELEPHONE CONNECTION AND CORRESPONDING COMMUNICATION DEVICE

(71) Applicant: THOMSON LICENSING, Issy de Moulineaux (FR)

(72) Inventors: Anton Werner Keller, Arni (CH); Rolf Guldener, Oetwl am See (CH); Stefan Dubach, Effingen (CH)

(73) Assignee: Thomson Licensing, Issy-les-Moulineaux (FR)

( * ) Notice: Subject to any disclaimer, the term of this patent is extended or adjusted under 35 U.S.C. 154(b) by 83 days.

(21) Appl. No.: 14/708,368

(22) Filed: May 11, 2015

(65) Prior Publication Data

US 2015/0332708 A1     Nov. 19, 2015

(30) Foreign Application Priority Data

May 13, 2014   (EP) .................................... 14305700

(51) Int. Cl.
*G10L 25/48*    (2013.01)
*H04M 3/42*    (2006.01)
*H04M 3/428*    (2006.01)

(52) U.S. Cl.
CPC ........... *G10L 25/48* (2013.01); *H04M 3/4285* (2013.01); *H04M 3/4286* (2013.01);
(Continued)

(58) Field of Classification Search
CPC .. H04M 1/72513; H04M 1/65; H04M 1/6515; H04M 1/652; H04M 1/654;
(Continued)

(56) References Cited

U.S. PATENT DOCUMENTS 4,677,569 A    6/1987   Nakano et al.
6,400,804 B1   6/2002   Bilder
(Continued)

FOREIGN PATENT DOCUMENTS

AU        644951       10/1992
CN        1801866 B    5/2010
(Continued)

OTHER PUBLICATIONS

Search Report dated October 16, 2014.
(Continued)

*Primary Examiner* — Walter Yehl
(74) *Attorney, Agent, or Firm* — Myers Wolin LLC (57) ABSTRACT

A method of handling telephone on-hold music, provided by a second party to a first party on a telephone connection between the first and the second party, includes detecting on-hold music, and providing, while on-hold music is detected, and to the first party, content from a source that is independent from the second party. A length of the most recently received audio signal originating from the second party is continuously stored. When on-hold music is no longer detected, voice information is retrieved from the stored length of the most recently received audio signal, providing, to the first party, content from a source that is independent from the second party is stopped, and the retrieved voice information is reproduced to the first party, wherein a time offset that corresponds to a time period required for detection of on-hold music is present.

19 Claims, 8 Drawing Sheets

(52) U.S. Cl.
CPC ............... *H04M 3/42221* (2013.01); *H04M 2203/2088* (2013.01); *H04M 2203/305* (2013.01)

(58) Field of Classification Search
CPC ........... H04M 3/42221; H04M 3/4285; H04M 3/4286; H04M 2203/2088; H04M 2203/305; G06F 17/27; G10L 25/48
See application file for complete search history.

(56) References Cited

U.S. PATENT DOCUMENTS

| | | | |
|---|---|---|---|
| 6,694,012 B1 | 2/2004 | Posthuma | |
| 7,136,479 B2 | 11/2006 | Gutta et al. | |
| 7,881,450 B1 | 2/2011 | Gentle et al. | |
| 8,126,125 B2 | 2/2012 | Koch | |
| 8,412,164 B2 | 4/2013 | Lee | |
| 8,451,086 B2 | 5/2013 | Petrovic et al. | |
| 8,619,965 B1 | 12/2013 | Figa et al. | |
| 2003/0235289 A1* | 12/2003 | Gutta | H04M 1/65 379/266.01 |
| 2004/0190700 A1* | 9/2004 | Cutaia | H04M 3/42221 379/202.01 |
| 2005/0147227 A1 | 7/2005 | Chervirala et al. | |
| 2005/0201531 A1* | 9/2005 | Kanter | H04M 3/4285 379/88.13 |
| 2007/0003045 A1 | 1/2007 | Florkey et al. | |
| 2007/0225030 A1 | 9/2007 | Teague | |
| 2008/0025554 A1* | 1/2008 | Landwehr | H04N 1/32144 382/100 |
| 2008/0095385 A1 | 4/2008 | Tourwe | |
| 2010/0150320 A1* | 6/2010 | Lingafelt | H04L 12/1831 379/68 |
| 2010/0245111 A1* | 9/2010 | Gaensler | H04M 1/72513 340/4.4 |
| 2012/0139726 A1 | 6/2012 | Brunson et al. | |

FOREIGN PATENT DOCUMENTS

| | | |
|---|---|---|
| JP | 1992-286443 A | 10/1992 |
| JP | 2002-16695 A | 1/2002 |
| WO | 1999/009731 A1 | 2/1999 |
| WO | WO2009073035 | 6/2009 |

OTHER PUBLICATIONS

Scheirer, Eric et al., "Construction and Evaluation of a Robust Multifeature Speech/Music Discriminator," Interval Research Corp., 1801-C Page Mill Road, Pao Alto, CA, 94304 USA, Proc. ICASSP-97, Apr. 21-24, 1997, Munich, Germany, pp. 1-4.

Seyerlehner, Klaus et al., "Automatic Music Detection in Television Productions," Dept. of Computational Perception, Johannes Kepler University, Linz, Austria, Proc. of the 10th Int. Conference on Digital Audio Effects (DAFx-07), Bordeaux, France, Sep. 10-15, 2007, cover sheet and pp. 1-8.

* cited by examiner

METHOD FOR HANDLING ON-HOLD MUSIC DURING TELEPHONE CONNECTION AND CORRESPONDING COMMUNICATION DEVICE

This application claims benefit, under 35 U.S.C. § 119, of European Patent Application 14305700 filed May 13, 2014.

FIELD

The present invention relates to communications, and, in particular, to audio content handling in telephone calls placed on-hold.

BACKGROUND

A common telephony feature is placing a user on "hold" or in an "on-hold" state. When a first user places a second user on hold, the connection is maintained while the first user's handset is disconnected from the connection. This allows the first user to take another call or step away from the handset. When the hold feature, or state, is enabled, the second user might be connected to another signal source for the receive signal path, such as broadcast news or a prerecorded message. A very common signal source for the on-hold connection is pre-recorded or broadcast music, termed "on-hold music", where music selections are transmitted to the receiver while the connection is in an on-hold state. The music selections are played out at the second user's handset receiver until the on-hold state is terminated.

The second user typically has no means of control over the on-hold music. Some types of on-hold music may be annoying or objectionable. Thus, there is a general desire to replace on-hold music with other content selected by the second user and provided at the second user's side of the connection. This desire has led to the development of various methods and apparatuses allowing for replacing on-hold music in telephone connections.

For example, WO 2009/073035 discloses a wireless telephone handset which, while in an on-hold state, allows a user to select one or more sources for play-out of media at a handset receiver, and then be signaled when the on-hold state is terminated. Detection of on-hold state is done by detecting on-hold music or by receiving an on-hold signaling. The media source is located in the user's handset or accessed through a separate connection established between the handset and the network.

Similarly, U.S. Pat. No. 7,136,479 discloses a replacing on-hold music with audio content from a local source at a telephone receiver. The local audio content is played to a user while on-hold music is detected.

More generally, U.S. Pat. No. 8,412,164 discloses reproducing various kinds of user-selectable data while a user is placed on hold in a telephone connection.

SUMMARY

The detection of on-hold music takes noticeable time. This is particularly undesirable when the on-hold music is terminated upon the on-hold condition being cancelled. For example, when a caller plays his or her own content while being placed on hold, the cancellation of the on-hold condition must be noticed or determined before the playout of the caller's own content can be stopped and the normal two-way voice communication is established. Thus, the caller who was previously placed on hold and listened to his or her own music might miss the first few words of what the other party said.

The present method alleviates or removes the undesirable situation discussed above.

In a first aspect of the present method, telephone on-hold music provided by a second party to a first party in a telephone connection is detected. Detection of on-hold music can be performed in a telephone device at the first party's side, which is the party that is placed on hold, or in a detector located in the network, in between the first and the second party, which has access to the connection, and which has some control over the connection. While detected, on-hold music is modified or enhanced under control of the first party, or replaced with content selected by the first party. Modification of on-hold music includes attenuation and muting. Enhancing includes adding non-audio content to the on-hold music, with the on-hold music being reproduced attenuated, i.e. at a lower volume, or entirely muted.

For example, a user might watch a slide show showing pictures while being put on hold. During the slide show the on-hold music is played back at lower volume, and all or selected ones of announcements interspersed with the on-hold music may be played back at a higher volume or even the original volume. Generally, fading between volume changes avoids click-noise.

Replacing includes replacing with any of audio or audiovisual content, including silence or static noise. Non-audio content includes slide shows, photo shows, texts, web-cam video, and the like. The content used for enhancing or replacing depends from the capabilities of the first party's equipment. The content replacing or enhancing the on-hold music is provided from a source that is independent from the second party.

Detecting on-hold music is carried out continuously. A length of the most recently received audio information originating from the second party is continuously stored. I.e., a few seconds worth of incoming audio information— directed towards the first party—is stored in a floating window fashion, always including the currently incoming audio information and audio information from a predetermined preceding time period. The length of incoming audio that is stored, i.e. the length of the floating window, depends on the time that is required for detecting on-hold music. As mentioned before, the detection of on-hold music takes some time, e.g. when using audio signal analysis, because the audio signal has to be analyzed over a certain period of time, depending on the algorithm. When no more on-hold music is detected after a preceding period during which on-hold music was detected, only voice information is retrieved from the stored length of the most recently received audio information. I.e., any on-hold music that may also be present in the stored time window is ignored and not retrieved. The audio signal analysis for on-hold music detection may use conventional algorithms, for example those known from music/speech recognition as proposed by Schreiner and Slaney in "Construction and evaluation of a robust multifeature Speech/Music discriminator", Interval Research Cor., Palo Alto Calif., or by Seyerlehner, Pohle, Schedl and Widmer in "Automatic Music Detection in Television Productions", 2007, Kepler University, Austria.

Generally, detection of on-hold music can be done in different ways. One way, using audio signal analysis, has already been mentioned before. Another way includes adding watermarks to the on-hold music, and optionally to voice announcements, too. Yet another way includes transmitting a signal, e.g. a flag, either in-band, similar to the RDS (Radio Data System) traffic announcements used in FM radio, or over a dedicated control channel. In each of the cases a detector is provided either at the first party's device or in the network and in communication with the first party's device. The time required for detection may vary between these different ways.

The type of on-hold music detection to be applied for a connection, i.e. audio signal analysis, watermarks, or a flag that is transmitted, may be preset depending on the telephone number dialed. Such information may be stored in a database accessed when dialing the number. The database can be updated automatically, e.g. over the internet, or through a learning algorithm. For example, once a telephone number is dialed, and on-hold music is received, a user can manually trigger a recognition process that tries each of the detection types, preferably starting with watermarks and flags. Once a specific type has been detected, the information is stored in the database for later reference. The user interaction can of course be replaced by having the audio signal analysis running permanently, trying to detect on-hold music. Once on-hold music is detected by audio signal analysis, the other methods can be tried for refinement, and the database can be updated based on the analysis. In a refinement, the database stores typical types of music associated with a telephone number, e.g. electronically generated music using few notes, or 'real' music recordings. This information may serve to achieve faster recognition by accordingly presetting the detector.

When on-hold music is no longer detected, modifying and enhancing, or replacing, on-hold music is stopped, and the retrieved voice information is reproduced to the first party. It is to be noted that the sequence of retrieving voice information and stopping modifying and enhancing, or replacing, is interchangeable. Due to the time required for detecting on-hold music, or the absence thereof, a time offset may be introduced in the communication between the first and the second party.

In an embodiment of the present method the time offset caused by the detection is eliminated after the on-hold music is no longer detected. In what may be termed a first catch up mode the voice information retrieved from the stored length of the most recently received audio information is played back at a higher speed than the original speed until the voice information played back from the stored length of the most recently received audio information originating from the second party corresponds to the audio information currently received from the second party. At this instant the offset introduced by the time required for detecting absence of on-hold music is cancelled, and the communication between the first and the second party is synchronized. At this point recording the information received from the second party may be stopped.

In a development of the first catch up mode, the higher pitch introduced by playing back the voice information retrieved from the stored length of the most recently received audio information at a higher speed than the original speed is adjusted down by corresponding audio signal processing.

In what may be termed a second catch up mode periods of silence are detected in the voice information retrieved from the stored length of the most recently received audio information. The periods of silence are shortened or even skipped during reproduction until the reproduced retrieved voice information and the audio information currently received from the second party correspond to each other. At this instant the offset introduced by the time required for detecting absence of on-hold music is cancelled, and the communication between the first and the second party is synchronized. At this point recording the information received from the second party may be stopped.

The first and the second catch up mode may be combined, achieving even faster synchronization of the communication between the first and the second party.

Very often, voice announcements are interspersed in the on-hold music, i.e. interrupt the music. This can disturb the on-hold music detection and lead to unwanted interruptions in the reproduction of the enhanced or replaced content, notably in case the interspersed announcements provide no additional information or value to the party on hold. Such announcements include, inter alia, generic or standard voice announcements like "please hold the line", "the service agent will be with you momentarily, thank you for your patience", or "all lines are busy, please wait". This type of announcement can be assigned to a group of first-type voice announcements, which can be ignored in the context of the present method.

In an embodiment the present method further includes identifying voice announcements interspersed in the on-hold music and ignoring voice announcements selected from a list of first-type voice announcements. I.e., the first-type voice announcements will not result in the reproduction of enhanced content or the replacement of content being stopped, even though voice announcements do not correspond to on-hold music. The voice announcements may be identified using the same functional block that performs the on-hold music detection. However, the functional blocks may as well be implemented separately. In all aspects of the present method the functional detection blocks may be implemented by a software program running on a general microprocessor, or on a dedicated audio processor, e.g. implemented in an ASIC or an FPGA, or a combination thereof. Nevertheless, all or some of the functional blocks may also be implemented by dedicated hardware.

In a related aspect of the present method voice announcements from a list of second-type generic or standard voice announcements are identified. Rather than ignoring these second-type voice announcements, such second-type voice announcements trigger stopping providing, to the first party, content from a source that is independent from the second party. Further, these second-type voice announcements inhibit reproducing the retrieved voice information at a higher speed. Second-type voice announcements in accordance with this aspect include, inter alia, voice announcements like "you will now be placed in the call". Inhibiting reproducing the retrieved voice information at a higher speed is possible due to the fact that it is sufficient to identify the first few words in order to infer the meaning of the voice announcement. In the above example, it is clear that the call will no longer be on hold after the announcement, and this can be inferred by recognizing the words "you will now". As the meaning of the second-type voice announcement is clear even before the entire announcement has been received, the time offset or delay introduced by voice recognition can be eliminated by skipping voice recognition on the remaining words. Eliminating the time offset or delay renders recording of non-announcement voice information unnecessary, and thus also renders reproduction of such recorded voice information unnecessary, because the connection between the first and the second party will be established and ready by the time the second party starts speaking.

In a development of the preceding aspect, the audio connection from the second party towards the first party is only enabled after detecting a period of silence at the end of a second-type voice announcement received immediately before. This development prevents the first user from having to listen to the remainder of a voice announcement of the second-type that has been recognized very quickly and long before the actual announcement is completed. Referring back to the example used in the preceding aspect, it may for example prevent the user from hearing " . . . in the call", assuming that the time for speaking " . . . be placed . . . " is sufficient for the identification of the voice announcement.

The previous aspect and the development thereof are also applicable to the aspect of the present method in which the time offset or delay created by recording voice information is not eliminated by reproducing at a higher speed but by shortening or skipping periods of silence, i.e. the second catch up mode. Such shortening or skipping of periods of silence is unnecessary in case the second-type standard voice announcement has been recognized quickly and before the announcement is even terminated. Like in the previous aspect and the development thereof, when the recognition is ready before the announcement is over, the time offset or delay introduced by voice recognition can be eliminated by skipping voice recognition on the remaining words. Eliminating the time offset or delay renders recording of non-announcement voice information unnecessary, and thus also renders reproduction of such recorded voice information unnecessary, because the connection between the first and the second party will be established and ready by the time the second party starts speaking. Likewise, in a corresponding development, the audio connection between the first and the second party is only enabled after detecting a period of silence. The reasons and effects are the same as for the development of the previous aspect.

The list of first-type voice announcements to be ignored or the list of second-type announcements inhibiting reproducing at a higher speed or inhibiting shortening or skipping periods of silence as discussed in the preceding aspects of the present method can be updated by a user. This may e.g. be done by recording a particular announcement to be ignored in future, or to trigger inhibiting in future, and storing the recorded announcement for future access and reference during on-hold music detection or voice announcement identification.

In an embodiment of the present method the on-hold music detection and/or the voice announcement detection are performed in a telephone device of the first party, and the audio or video content from a source that is independent from the second party is provided from a storage provided in or directly connected with the first party's telephone device. This allows for simple control of enhancing the on-hold music or replacing it.

In a variant of the foregoing embodiment, the content is provided over a different connection, e.g. a Bluetooth or a WLAN connection, from a server located remote from the first party's telephone device. However, it is also conceivable that the voice communication and the replacement content are provided over the same physical connection, but over separate logical connections. This may be the case when the physical connection has a data rate superior to the data rate required for the voice communication, e.g. in a voice over IP system using WLAN, or in a UMTS or LTE network, or the like.

In another embodiment of the present method the on hold music detection and/or the voice announcement detection are performed in a detector located in a network over which the telephone connection between the first and the second party is routed. Still, the enhancement or replacement content is provided from a storage provided in the first party's telephone device. In accordance with this embodiment the detector generates signals for enabling controlling the enhancement or replacement in the first party's telephone device, which are received and accordingly used by the first party's telephone device. Such signals include in-band signals in the voice channels, e.g. DTMF signals, and out-of-band signals, e.g. provided over a separate connection, e.g. a message routed over an IP connection, or a signal or flag provided through a control channel as commonly used by telephone systems.

In a variant of the foregoing embodiment the detector may be capable of controlling a part of the telephone connection between the first and the second party. Notably, the detector may control the voice channels, and replace the on-hold music towards the first party with content obtained from a server attached to the network, in accordance with a first party's preferences or previous selection.

In a development of the foregoing embodiment, the first party controls the content replaced by the detector by sending corresponding signals towards the detector. This can be done in-band, e.g. using DTMF signals, or out-of-band, in the same manner as described further above. Such control may, e.g., be used for selecting the kind of content that replaces the on-hold music. For example, the first party may select a music style.

In accordance with another aspect of the present method on-hold music detection and/or detection of voice announcements includes detection of corresponding audio watermarks added to on-hold music and/or voice announcements. Such watermarks are usually inaudible or hidden and relatively unobtrusive and may allow for very fast detection or recognition, keeping the offset introduced by the detection to a minimum or even eliminating the offset. Watermarks are unambiguously identifiable and are robust against signal processing, or variations and fluctuations in a communication channel. Different watermarks may be provided for waiting music, voice announcements, advertisements and the like.

Watermarks may be selectively added to the on-hold music depending on whether or not a first or second party's telephone number is registered in an according list of telephone numbers. Such list can indicate for example if a registered telephone number is associated with a premium tariff, or if the equipment associated with that telephone is capable at all of detecting and recognizing watermarks. Alternatively, a user may purchase a key for detecting watermarking. Adding watermarks may be done at the second party or by the telephone system, in accordance with the previous examples.

The watermarking can be either placed by the originator of the waiting-queue, i.e. the second party, or by the network provider, which functions as kind of a "man in the middle" who replaces the second party's on-hold music with advertising. This aspect allows for various businesses. For example, if the called connection is a paid connection then by replacing on-hold music with advertisements the time spent on hold is free of charge, or the total charge for the connection is reduced. Alternatively, the party put on hold can enter a key, e.g. using DTMF signaling, for which watermarks are added to the on-hold music, which then enable detection and replacement of on-hold music and also advertising at the receiving end. Such keys for detecting watermarking may be purchased by the user on a call-by-call basis, or the user may be identified by his or her telephone number as having already paid for watermarks. It is also conceivable for a network provider or the second party to have a profile of the waiting person, allowing for sending personalized content. For example, a lover of Jazz music will have Jazz music played while on hold.

In accordance with another aspect of the present method a party that was put on hold and was consuming enhanced or replaced content does not want to switch back to the conversation immediately when the other party cancels the on-hold status. When the end of on-hold music is detected the detector issues a voice message to the second party indicating that the first party will be available momentarily or after a certain time. This message avoids the impression that the first party has hung up the phone. In this case the delay caused by the detection of on-hold music is irrelevant and can be eliminated easily: when the second party hears the message the person listening waits with talking and thus all delays can easily be set to zero, e.g., using one of the methods previously described. The first party can now quietly terminate consuming the content.

It will be readily apparent to the skilled person that the aspects, embodiments and variants described hereinbefore can be combined. For example, using watermarks for detection of on-hold music and/or voice announcements can be implemented with any of the embodiments incorporating the first and/or the second catch up mode. Likewise, when using watermarks for detection of on-hold music and/or voice announcements, the detection can be performed at the first party's telephone device or in a detector located in the network. Other combinations of aspects, embodiments, and variants thereof are readily conceivable and will not be discussed in detail.

The present method can be incorporated into many types of communication systems, e.g. conventional telephone systems, cellular telephone systems, VOIP telephone systems, videoconferencing systems and radio communications systems.

BRIEF DESCRIPTION OF THE DRAWINGS

In the following exemplary embodiments of the method will be described with reference to the attached drawings, in which.

DESCRIPTION OF EMBODIMENTS

Figure 1:
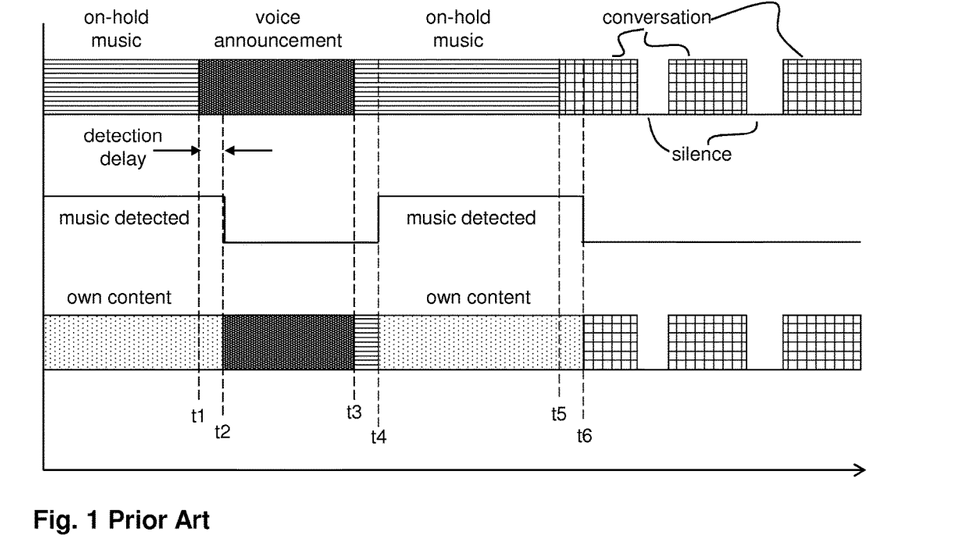
FIG. 1 shows a timing diagram of prior art on-hold music detection and content replacement.

FIG. 1 shows timing diagram of prior art on-hold music detection and replacing the on-hold music with other content. In the figure the x-axis represents the time and the top-most row represents the audio signal as received by a first party that was previously put on hold by a second party. The middle row represents an output from a detector that detects on-hold music. The bottom row represents the signals actually output to the first party. Beginning at the left side of the diagram, the second party transmits on-hold music, indicated by the horizontal hash pattern. In accordance with an output of the detector the on-hold music is replaced with other content, e.g. the first party's own content, indicated by the light dot pattern. At t1 a voice announcement, indicated by a dark dot pattern, interrupts the on-hold music. At t2 the detector, which requires a certain time period for securely recognizing that the on-hold music is over, has noticed that a voice signal is now received and stops replacing the signal coming from the second party with the first party's own content. The first party now hears the remainder of the voice announcement. However, the first party misses the part of the voice announcement corresponding to the time period t2-t1, i.e. corresponding to a detection delay. When the voice announcement is over at t3 the on-hold music continues. The first party hears the on-hold music until at t4, after the detection delay is over, the on-hold music is replaced again with the first party's own content. The same happens at t5, when the on-hold music is over and the second party starts talking, indicated by the square hash pattern. The first party will miss what has been said until at t6 the detector has recognized that the on-hold music is over and stops replacing the signal coming from the second party.

Figure 2:
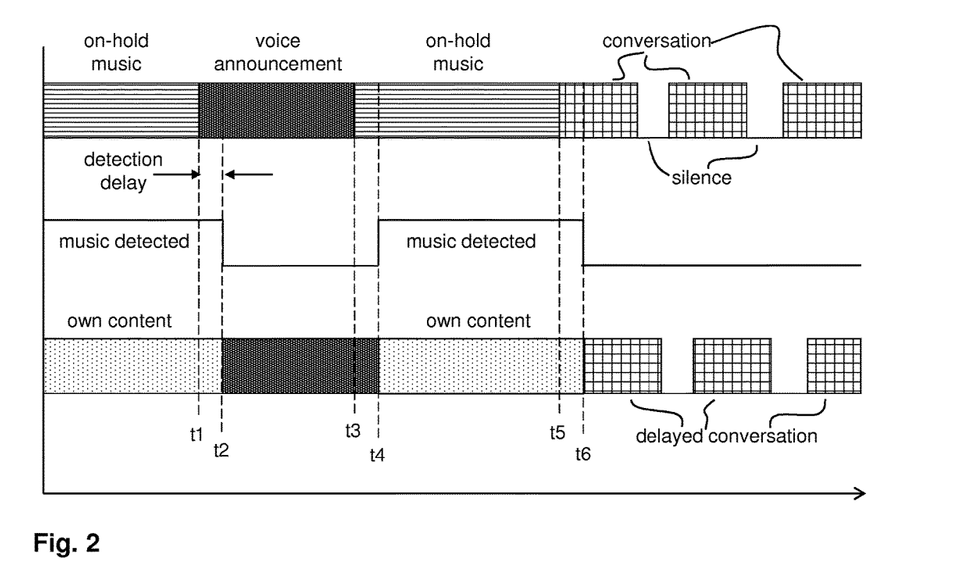
FIG. 2 shows a timing diagram of on-hold music detection and content replacement in accordance with a first aspect of the present method.

FIG. 2 shows a timing diagram of on-hold music detection and content replacement in accordance with a first aspect of the present method. The rows and the hashing correspond to FIG. 1. Unlike in FIG. 1 the signal received from the second party is recorded. Like in FIG. 1, when a voice announcement is received at t1 the music detection needs some time to recognize this an non-music signal. At t2, reproduction of the first party's own content is stopped and the non-music signal from the recording, i.e. the voice announcement, is reproduced to the first party. In the meantime the voice announcement as received by the first party is over at t3. The on-hold music detector has detected the on-hold music and at t4 replaces the on-hold music with the first party's own content when the reproduction of the recorded voice announcement is over. In this and all other embodiments described in this patent specification, the time when the reproduction of the voice announcement is over can be determined for example by the known or estimated time required for on-hold music detection, or by performing voice detection on the recording. Since the voice announcement is recorded, the detection can be performed at a higher speed than in real-time. At t5 the on-hold music is over, and at t6 the detector has recognized this fact. The replacement of on-hold music with the first party's own content is stopped, and the non-music signal from the recording, i.e. what has been said by the second party, is reproduced to the first party. Thus, the first party does not miss anything said by the second party. The time offset due to the recognition remains, however, and will have to be settled by the first and second parties during the conversation.

Figure 3:
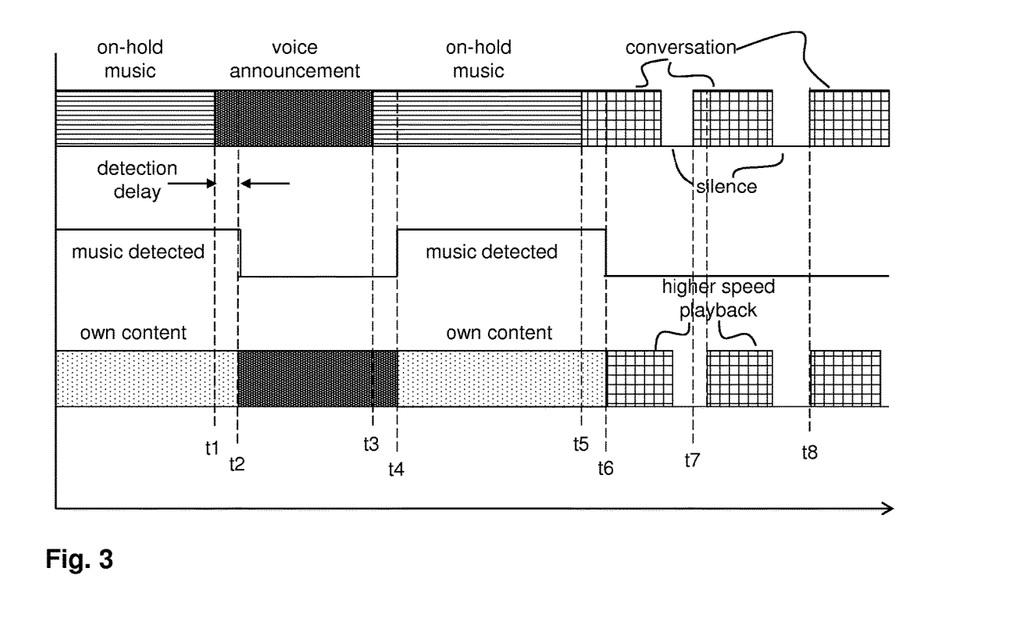
FIG. 3 shows a timing diagram of on-hold music detection and content replacement in accordance with a second aspect of the present method.

FIG. 3 shows a timing diagram of on-hold music detection and content replacement in accordance with a second aspect of the present method. The initial situation is the same as described with regard to FIG. 2. This aspect deals with the time offset that exists at t6 when the conversation between the two parties is just beginning. In order to eliminate the time offset the non-music signal from the recording is played back or reproduced at a higher speed than it was recorded at. This is indicated by the cross hatched boxes representing conversation received from the second party being drawn shorter, or compressed, than the incoming signal. At t7 the remaining time offset is already reduced, and at t8 it is fully eliminated. Depending on the time required for detecting on-hold music, or the absence thereof, or on the length of conversation coming from the second party, the delay may already be eliminated after the first period of silence.

Figure 4:
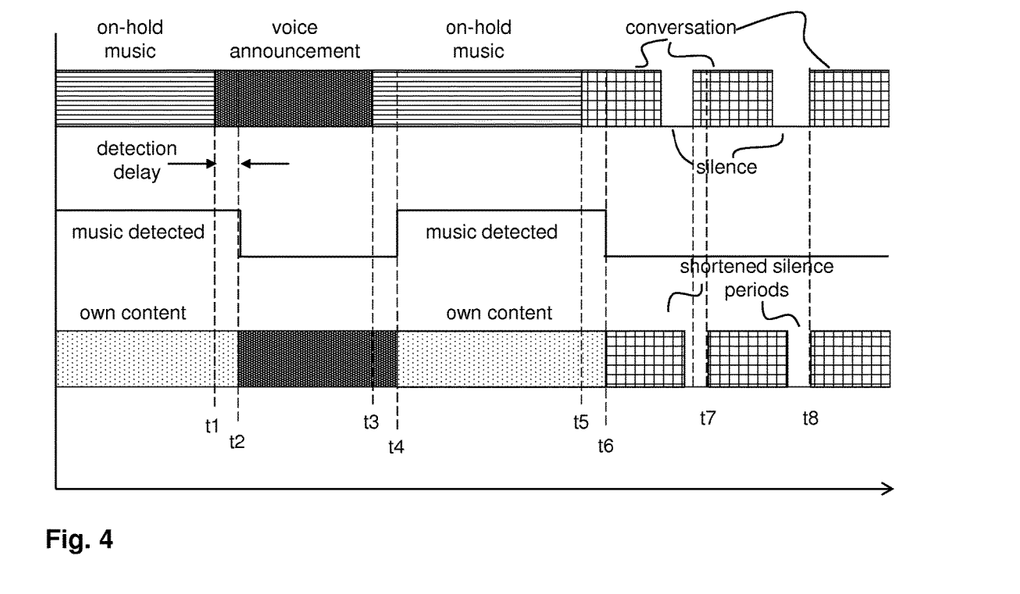
FIG. 4 shows a timing diagram of on-hold music detection and content replacement in accordance with a third aspect of the present method.

FIG. 4 shows a timing diagram of on-hold music detection and content replacement in accordance with a third aspect of the present method. The initial situation is the same as described with regard to FIG. 2. Again, this aspect deals with the time offset that exists at t6 when the conversation between the two parties is just beginning. In order to eliminate the time offset, periods of silence in the recorded non-music signal are shortened or skipped, indicated by the periods of silence being shorter in the bottom row as compared to the periods of silence in the top row. At t7 the remaining time offset is already reduced, and at t8 it is fully eliminated. The time when the offset is fully eliminated depends on the duration and frequency of periods of silence.

Figure 5:
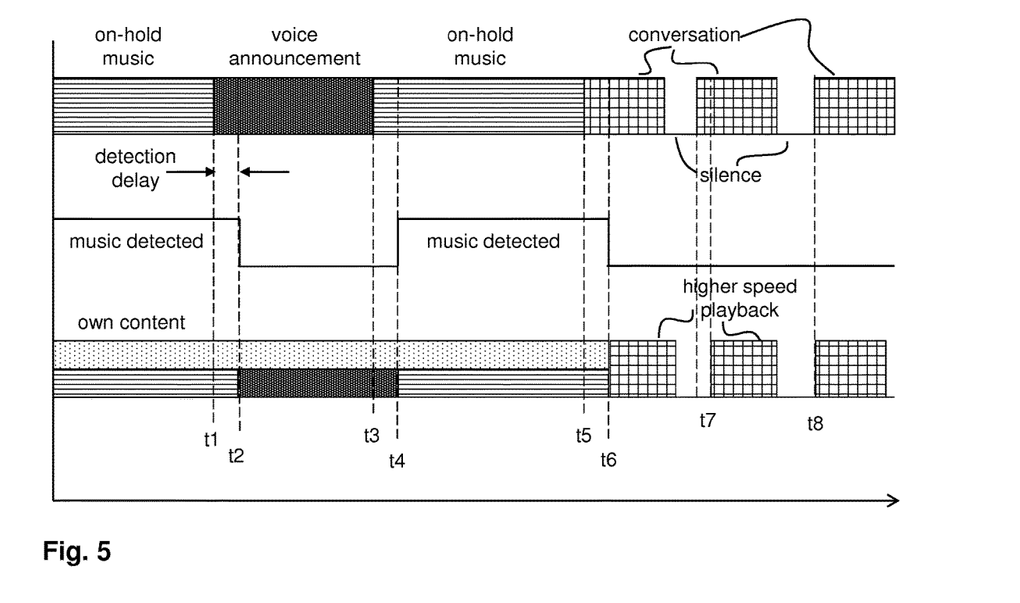
FIG. 5 shows a timing diagram of on-hold music detection and enhancement in accordance with a fourth aspect of the present method.

FIG. 5 shows a timing diagram of on-hold music detection and enhancement in accordance with a fourth aspect of the present method. The sequence of detecting on-hold music and catching up the offset is the same as discussed with regard to FIG. 3 or 4. However, instead of replacing the on-hold music, in this aspect of the present method the on-hold music is attenuated, and complemented by non-audio content at the first party's side. Also, in this exemplary embodiment of this aspect shown in FIG. 5, the voice announcement remains at an attenuated volume between t2 and t3, for example due to a detection mechanism having found out that the voice announcement contains no useful information for the first party. When the conversation is on again at t6 the non-music signal from the recording is reproduced at a normal volume.

Figure 6:
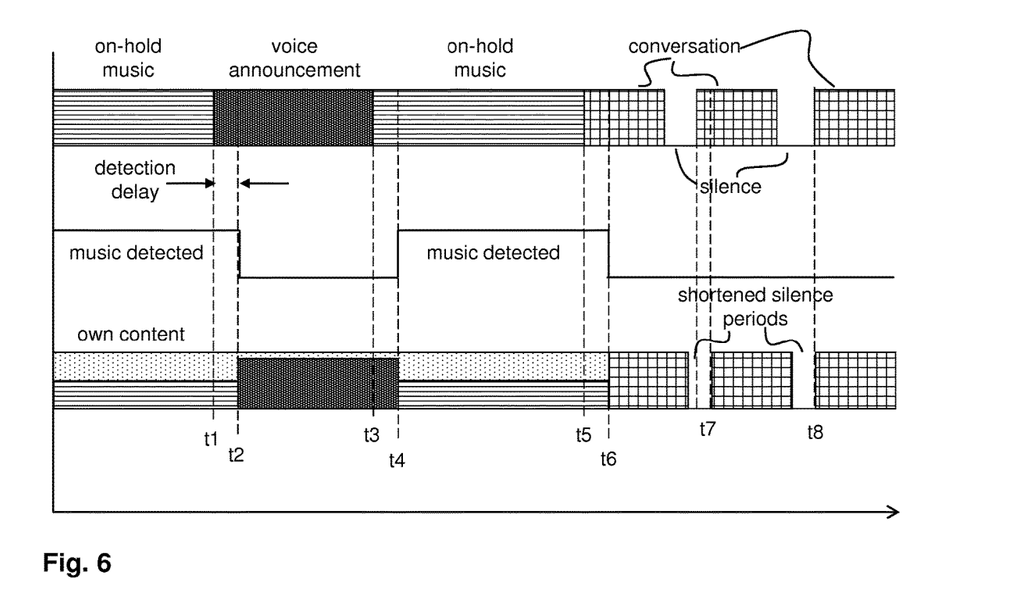
FIG. 6 shows a timing diagram of on-hold music detection and enhancement in accordance with a fifth aspect of the present method.

FIG. 6 shows a timing diagram of on-hold music detection and enhancement in accordance with a fifth aspect of the present method. The sequence of detection and enhancement is very similar to what has been described with regard to FIG. 5. However, in this aspect of the present method the voice announcement between t2 and t3 is attenuated less than the on-hold music, or is not attenuated at all, indicated by the box with the dark dot pattern being higher than the boxed representing the on-hold music. This can be done for any signal that is not on-hold music, or exclusively for voice messages carrying useful information for the first party, using appropriate voice recognition techniques.

Figure 7:
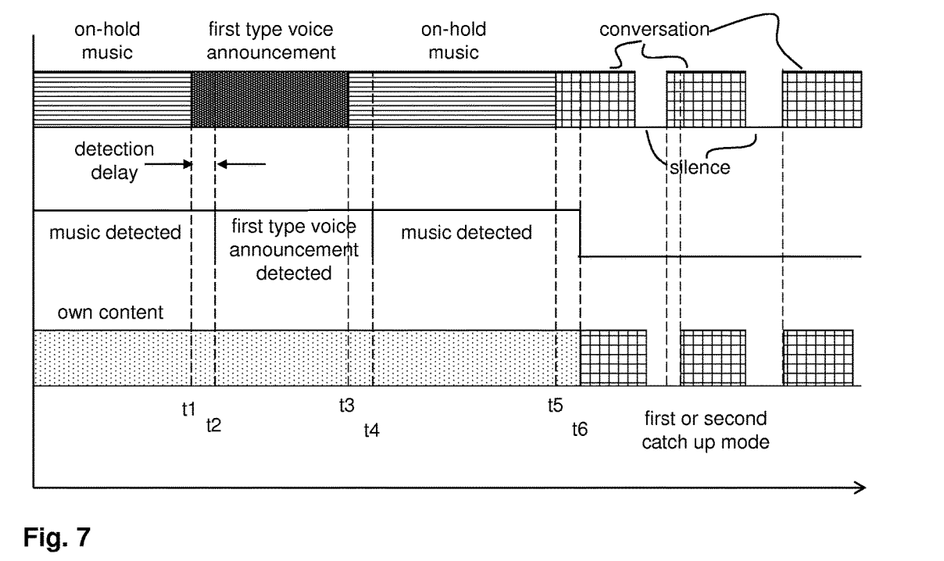
FIG. 7 shows a timing diagram of on-hold music detection and content replacement in accordance with a sixth aspect of the present method.

FIG. 7 shows a timing diagram of on-hold music detection and content replacement in accordance with a sixth aspect of the present method. Like in FIG. 2 the signal received from the second party is recorded. Like in FIG. 2, when a voice announcement is received at t1 the music detection needs some time to recognize this as a non-music signal. At t2, the music detection recognizes that there is no on-hold music. However, a voice recognition that kicked in recognizes that the voice announcement is of a first standard type, e.g. telling the first party to keep holding the line, providing no new useful information to the first party. Thus, the voice announcement, like the on-hold music before, is replaced with the first party's own content. The remaining part of the figure has been described in one or more of FIGS. 2 to 6 and will not be described any further.

Figure 8:
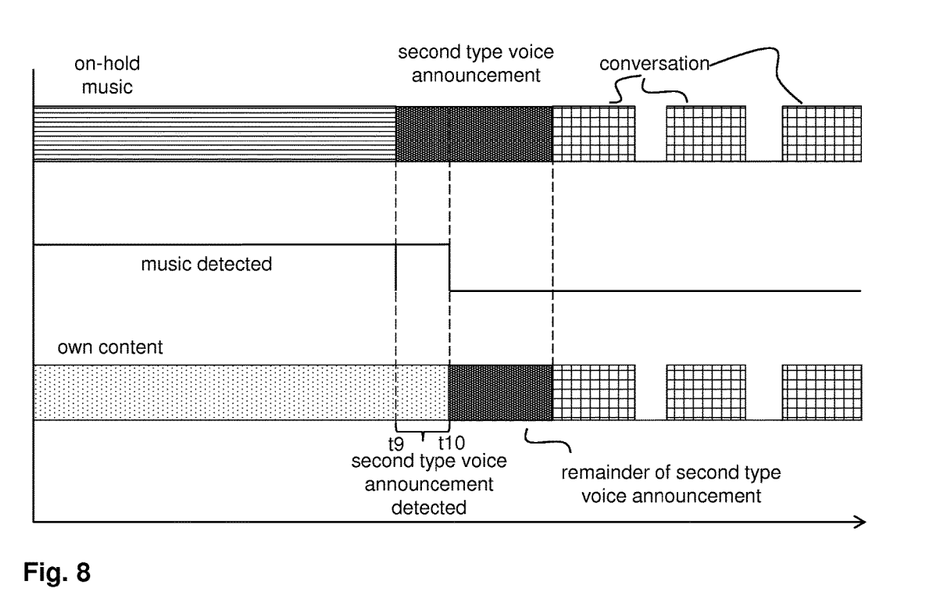
FIG. 8 shows a timing diagram of on-hold music detection and content replacement in accordance with a seventh aspect of the present method.

FIG. 8 shows a timing diagram of on-hold music detection and content replacement in accordance with a seventh aspect of the present method. Initially, the on-hold music is replaced with the first party's own content. At t9 a voice announcement of a second standard type is received, indicating that the line will be taken off hold momentarily. At t10 the voice announcement has been recognized and replacing the on-hold music with the first party's own content is stopped. Since the meaning of second-type voice announcements can be inferred after performing voice recognition on only a part of the announcement, switching over to the received signal can be done very quickly, even before the entire announcement is over. Thus, the first party may hear the remainder of the announcement. However, there is no offset caused by on-hold music recognition, and there is thus no need to catch up once the conversation begins.

Figure 9:
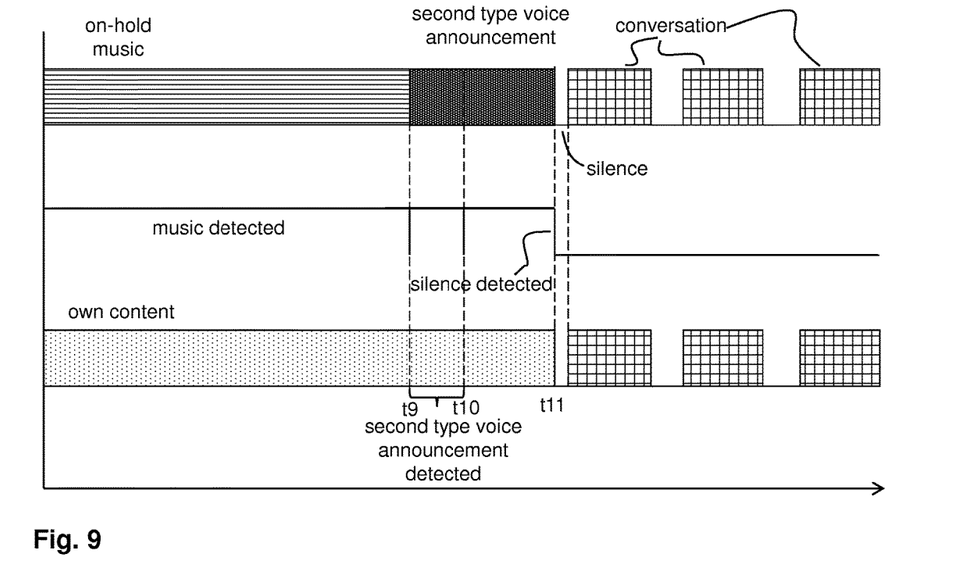
FIG. 9 shows a timing diagram of on-hold music detection and content replacement in accordance with a eighth aspect of the present method.

FIG. 9 shows a timing diagram of on-hold music detection and content replacement in accordance with a eighth aspect of the present method. The initial situation is the same as in FIG. 8. However, rather than switching over to the received signal at t10, as shown in FIG. 8, the switchover only happens at t11, when a period of silence was detected, allowing to infer that the voice announcement is over and that the conversation will immediately begin.

Figure 10:
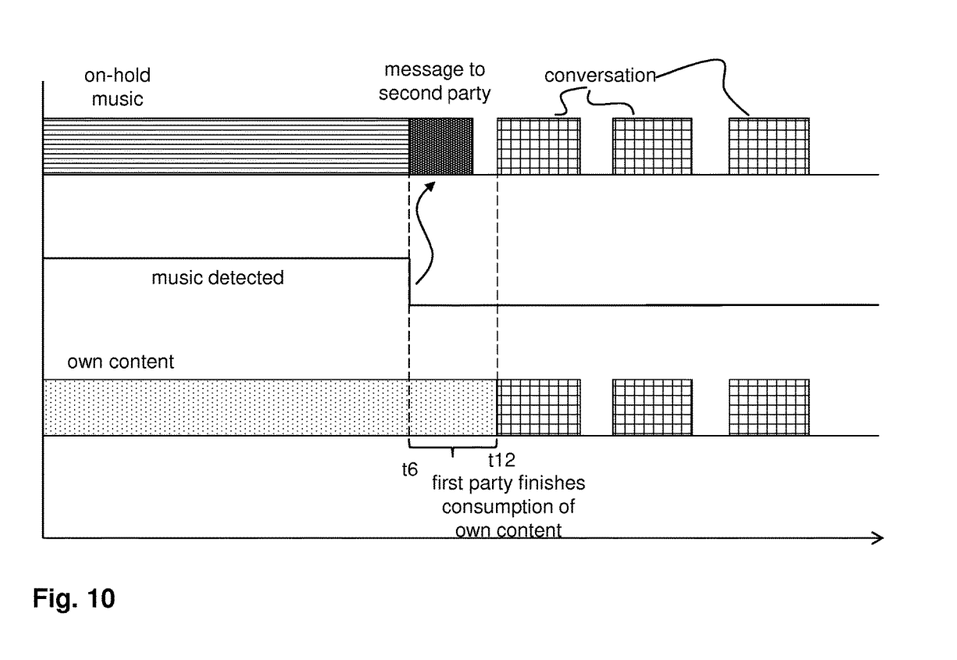
FIG. 10 shows a timing diagram of on-hold music detection and content replacement in accordance with a ninth aspect of the present method.

FIG. 10 shows a timing diagram of on-hold music detection and content replacement in accordance with a ninth aspect of the present method. In accordance with this aspect of the present method, on-hold music is replaced at a first party's side in accordance with one or more of the embodiments and aspects described above. When the end of the on-hold music is detected the first party desires to finishing consumption of his or her own content. Hence, once the end of the on-hold music was detected at t6, the first party issues a voice message to the second party indicating that the first party will be available momentarily. After finishing consuming the own content at t12 the first party joins the conversation in a conventional way.

Figure 11:
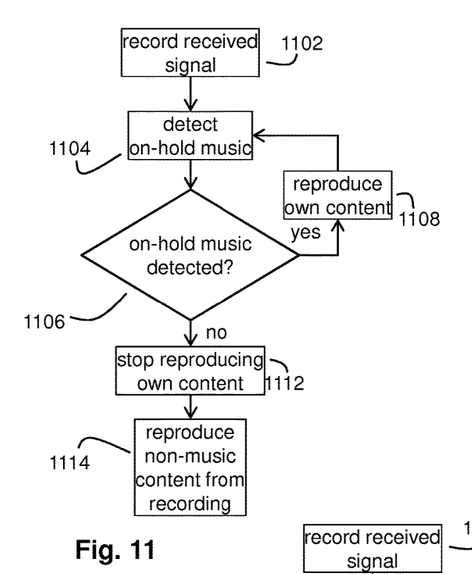
FIG. 11 shows a flow diagram of on-hold music detection and content replacement in accordance with the first aspect of the present method.

FIG. 11 shows a flow diagram of on-hold music detection and content replacement in accordance with the first aspect of the present method. At step 1102 the received signal is recorded. At step 1104 on-hold music detection is performed on the received signal. As long as on-hold music is detected, yes-branch of step 1106, a first party's own content is reproduced, replacing or enhancing the on-hold music, step 1108. When on-hold music is no longer detected, no-branch of step 1106, reproducing or enhancing of the first party's own content is stopped, step 1112, and only the non-music content is reproduced from the recording, e.g. what the second party in the telephone line had said, step 1114.

Figure 12:
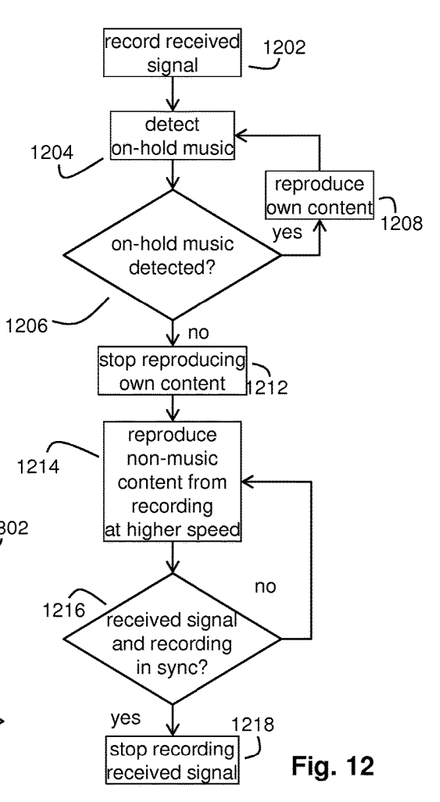
FIG. 12 shows a flow diagram of on-hold music detection and content replacement in accordance with the second aspect of the present method.

FIG. 12 shows a flow diagram of on-hold music detection and content replacement in accordance with the second aspect of the present method. Steps 1202 to 1212 correspond to steps 1102 to 1114 of FIG. 1. Like in step 1114 of FIG. 1, at step 1214 only the non-music content is reproduced from the recording, but in this aspect of the present method the reproduction is at a higher speed than the original speed, for catching up the delay introduced by the on-hold music detection. Reproduction at a higher speed is done while the signals currently received and the signals reproduced form the recording are not synchronized, no branch of step 1216. Once the signals currently received and the signals reproduced form the recording are synchronized, yes branch of step 1216, further recording of signals currently received is stopped, step 1218, and the conversation is continued in a conventional way.

Figure 13:
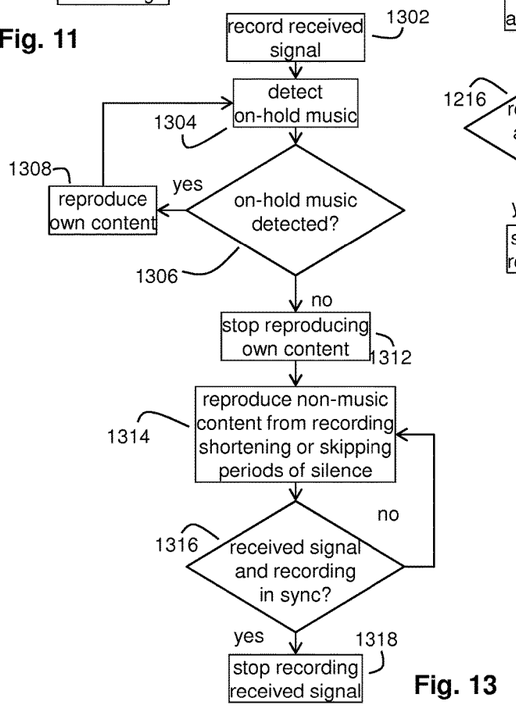
FIG. 13 shows a flow diagram of on-hold music detection and content replacement in accordance with the third aspect of the present method.

FIG. 13 shows a flow diagram of on-hold music detection and content replacement in accordance with the third aspect of the present method. Steps 1302 to 1312 correspond to steps 1102 to 1114 of FIG. 1. Like in step 1114 of FIG. 1, at step 1314 only the non-music content is reproduced from the recording, but in this aspect of the present method the reproduction includes shortening or skipping periods of silence in the recorded non-music content. Reproduction shortening or skipping periods of silence is done while the signals currently received and the signals reproduced form the recording are not synchronized, no branch of step 1316. Once the signals currently received and the signals reproduced form the recording are synchronized, yes branch of step 1316, further recording of signals currently received is stopped, step 1318, and the conversation is continued in a conventional way.

Figures 14, 15:
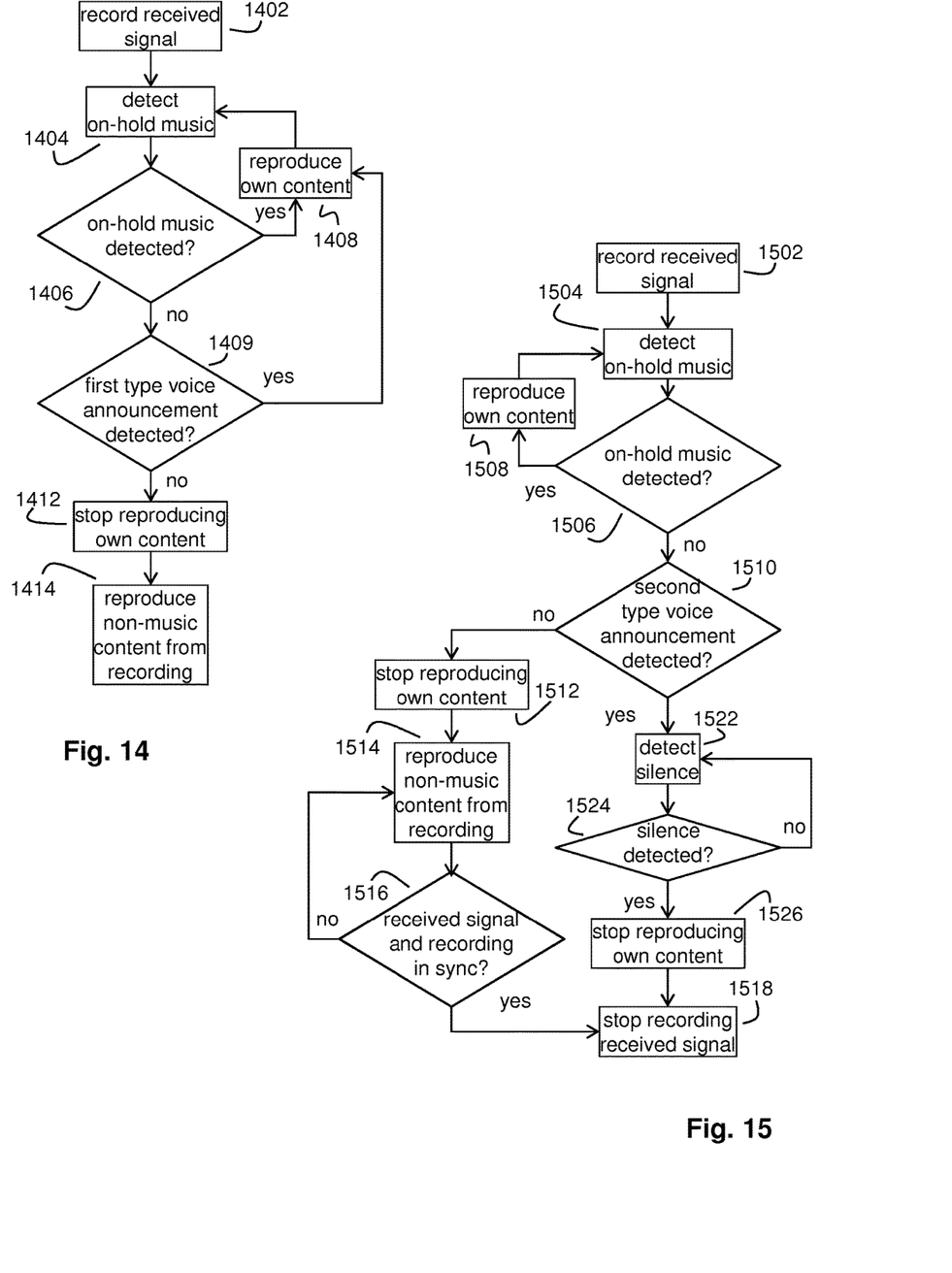
FIG. 14 shows a flow diagram of on-hold music detection and content replacement in accordance with the sixth aspect of the present method.
FIG. 15 shows a flow diagram of on-hold music detection and content replacement in accordance with the eighth aspect of the present method.

FIG. 14 shows a flow diagram of on-hold music detection and content replacement in accordance with the sixth aspect of the present method. Steps 1402 to 1408 correspond to steps 1102 to 1108 of FIG. 1. If no on-hold music is detected, no-branch of step 1406, step 1409 detects first-type voice announcements in the received signals. If such first-type voice announcement is detected, yes-branch of step 1409, the on-hold music is replaced with the first party's own content, step 1408, and the detection of on-hold music is continued in step 1404. If no first-type voice announcement is detected, no-branch of step 1409, reproducing or enhancing of the first party's own content is stopped, step 1412, and only the non-music content is reproduced from the recording, e.g. what the second party in the telephone line had said, step 1414. It is to be noted that the reproduction of the non-music content can be done in any of the ways described in FIG. 12 or 13, or in a combination thereof.

FIG. 15 shows a flow diagram of on-hold music detection and content replacement in accordance with the eighth aspect of the present method. Steps 1502 to 1508 correspond to steps 1102 to 1108 of FIG. 1. If no on-hold music is detected, no-branch of step 1506, step 1510 detects second-type voice announcements in the received signals. If no second-type voice announcement is detected, no-branch of step 1510, reproducing or enhancing of the first party's own content is stopped, step 1512, and only the non-music content is reproduced from the recording, e.g. what the second party in the telephone line had said, step 1514. It is to be noted that the reproduction of the non-music content can be done in any of the ways described in FIG. 12 or 13, or in a combination thereof. Reproduction at a higher speed or involving shortening or skipping periods of silence is done while the signals currently received and the signals reproduced form the recording are not synchronized, no branch of step 1516. Once the signals currently received and the signals reproduced form the recording are synchronized, yes branch of step 1516, further recording of signals currently received is stopped, step 1518, and the conversation is continued in a conventional way. If such second-type voice announcement is detected, yes-branch of step 1510, silence in the currently received signal is detected, step 1522 and no-branch of step 1524. When silence is detected in the currently received signal, yes-branch of step 1524, reproduction of the first party's own content and recording of received signals is stopped, steps 1526 and 1518. The conversation is then continued in a conventional way.

Figure 16:
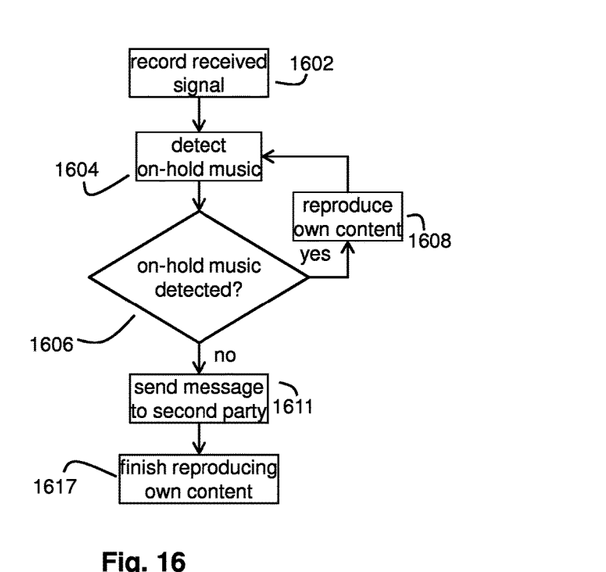
FIG. 16 shows a flow diagram of on-hold music detection and content replacement in accordance with the ninth aspect of the present method.

FIG. 16 shows a flow diagram of on-hold music detection and content replacement in accordance with the ninth aspect of the present method. Steps 1602 to 1608 correspond to steps 1102 to 1108 of FIG. 1. If no on-hold music is detected, no-branch of step 1606, step 1611 issues a message—via the same audio channel used in the normal conversation—to the second party, informing the second party that the first party will be available momentarily. The first party finishes reproducing the own content, step 1617, and joins the conversation in a conventional way. Since the second party is waiting for the first party to join any delay caused by waiting music detection at the first party's side is cancelled by the time the first party finishes reproducing its own content and joins the conversation.

Figure 17:
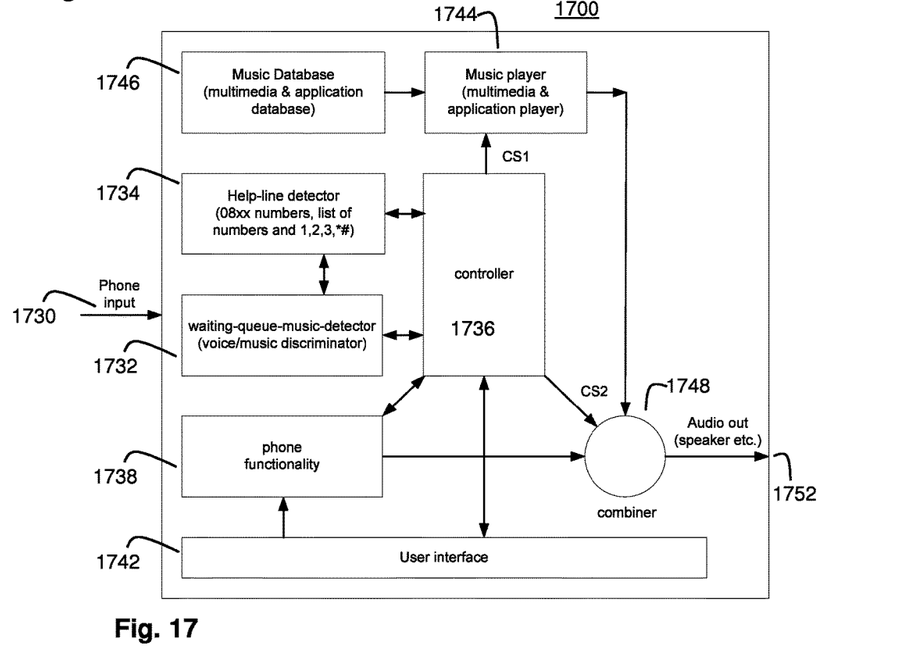
FIG. 17 shows an exemplary block diagram of a first party's device in accordance with the present method.

FIG. 17 shows an exemplary block diagram of a first party's device 1700 in accordance with the present method. Input 1730 receives the audio signal, including one or more of on-hold music, announcements, and conversation. Block 1732 performs on-hold music detection in one of the ways described further above, e.g. by audio signal analysis. Block 1732 is in connection with block 1734, which selects or primes the on-hold music detection block based on a telephone number dialed, e.g. sets filter parameters for on-hold music detection, or selects one of the various ways for on hold music detection, i.e. watermark, flag, or audio signal analysis. Blocks 1732 and 1734 are connected to controller 1736, which is also connected to block 1738, providing general phone functions, and user interface block 1742. User interface block 1742 is also connected to block 1738. Controller 1736 controls music player block 1744, which is in connection with content database 1746. Music player block 1744 may be part of a mobile phone, but may also include any source of content attached to the first party's device. Combiner 1748 selects and/or combines audio signals received from phone function block 1738 and music player block 1744, respectively, under control of controller 1736, and provides an audio signal to output 1752.

The invention claimed is:

1. A method performed by a first communication device, the method including:

continuously storing, by said first communication device, a length of most recently received audio information included in information transmitted through a connection maintained by said first communication device while applying, with the aid of a music detector, an on-hold music detection based on an analysis of said information transmitted through said connection;

when said music detector outputs that said on-hold music is no longer present in said audio information received by said first communication device, playing back, by of an output module of said first communication device, voice information retrieved from the stored length of the most recently received audio information, and stopping the storing of said length of the most recently received audio information, when said music detector indicates that said on-hold music is no longer present in said audio information received at a receiver, once a played back voice information is synchronized with the audio information currently received.

2. The method of claim 1, wherein playing back includes playing back the retrieved voice information at a speed that is higher than the original speed until the played back retrieved voice information and audio information currently received by said first communication device correspond to each other.

3. The method of claim 2, wherein playing back at a higher speed includes adjusting a pitch of the played back voice information.

4. The method of claim 2, including:
identifying voice announcements in the on-hold music; and
inhibiting playing back the retrieved voice information at a higher speed for voice announcements selected from a list of second-type voice announcements.

5. The method of claim 4, including enabling an output of audio information currently received by said first communication device only upon detection, in said retrieved voice information, of a period of silence after identifying the selected one from a list of second-type voice announcements.

6. The method of claim 4, including receiving a user input for updating the list of second-type voice announcements.

7. The method of claim 4, wherein identifying voice announcements includes detecting an audio watermark added to the second-type voice announcement.

8. The method of claim 1, wherein playing back includes detecting periods of silence in the retrieved voice information, and shortening or skipping the periods of silence until the played back retrieved voice information and audio information currently received by said first communication device correspond to each other.

9. The method of claim 8, including:
identifying voice announcements in the on-hold music; and
inhibiting shortening or skipping periods of silence for selected ones from a list of second-type voice announcements.

10. The method of claim 9, including enabling an output of audio information currently received by said first communication device only upon detection, in said retrieved voice information, of a period of silence after identifying the selected one from a list of second-type voice announcements.

11. The method of claim 1, including:
identifying voice announcements interspersed in the on-hold music; and
ignoring voice announcements selected from a list of first-type voice announcements.

12. The method of claim 11, including receiving a user input for updating the list of first-type voice announcements.

13. The method of claim 11, wherein identifying voice announcements includes detecting an audio watermark added to the first-type voice announcement.

14. The method of claim 1, wherein on-hold music detection includes detecting an audio watermark added to the on-hold music.

15. The method of claim 1, wherein said music detector is located in a network over which said connection is routed, and said method comprise receiving signals output by said music detector and indicating presence of on-hold music, or a call being taken off hold.

16. The method of claim 1, including outputting, by said output module, a modified and/or enhanced version of said audio information received from said connection while the music detector outputs that the on-hold music is present in said audio information.

17. A communication device including:
a receiver adapted to receive information transmitted through at least one connection maintained by said communication device; and output module adapted to play an audio signal;
a controller adapted to:
process a signal output from a music detector adapted to perform an on-hold music detection based on an analysis of said information transmitted through said connection;
continuously store in a memory of said communication device a length of most recently received audio information included in said transmitted information received from said receiver, while said signal output from said music detector indicates that an on-hold music is present in said audio information;
provide to said output module voice information retrieved from the length of the most recently received audio information stored in the memory, when said signal output by said music detector indicates that an on-hold music is no longer present in said audio information received at the receiver; and
stop storing said length of the most recently received audio information, when said signal output by said music detector indicates that an on-hold music is no longer present in said audio information received at the receiver, once said played back voice information is synchronized with the audio information currently received at said receiver.

18. The communication device of claim 17 wherein said on-hold music detector is included in said first communication device.

19. The communication device of claim 17, wherein said controller is adapted to modify and/or enhance said audio information currently received from said receiver and to provide said modified and/or enhanced audio information to said output module while said music detector outputs that an on-hold music is present in said audio information.

* * * * *